Sept. 2, 1969     R. S. SOLOFF     3,464,102
SOLID ACOUSTIC HORN WITH SUCTION MEANS
Filed March 10, 1967
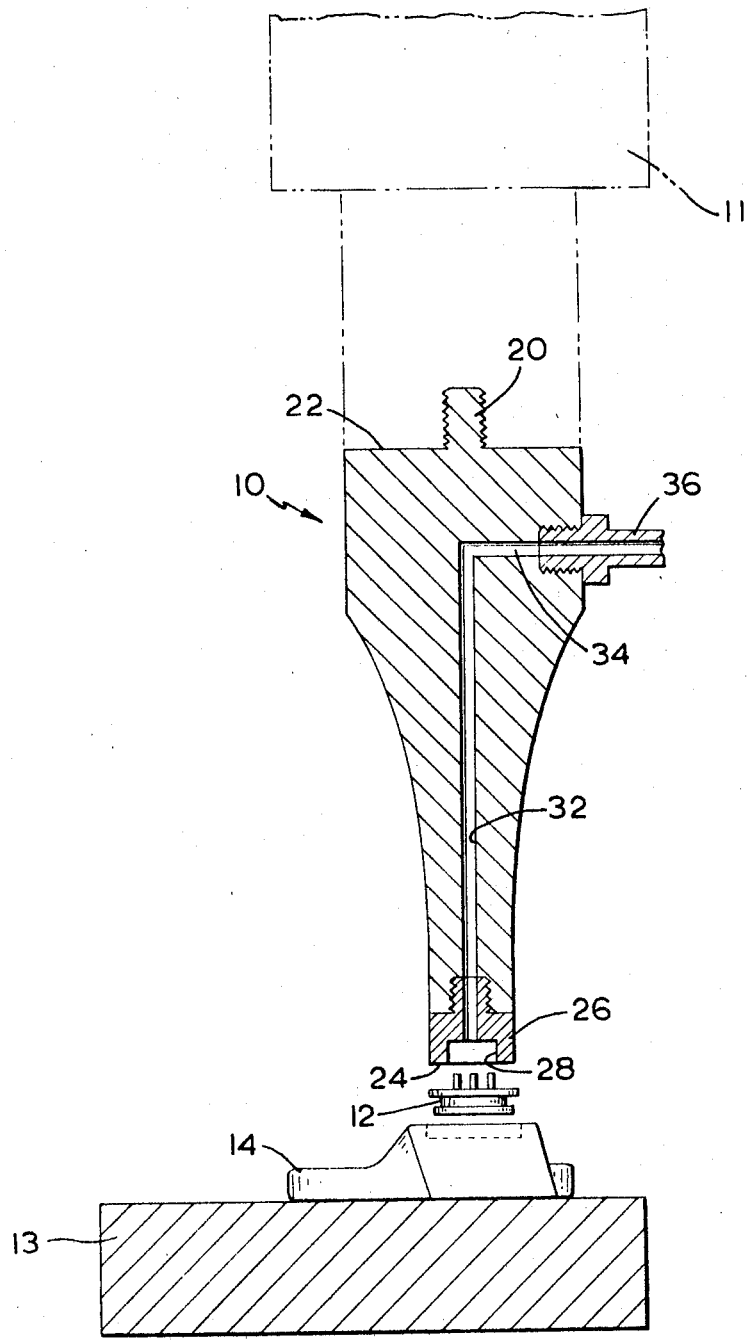
INVENTOR.
ROBERT S. SOLOFF
BY:
Ervin B. Steinberg United States Patent Office 3,464,102
Patented Sept. 2, 1969

3,464,102
SOLID ACOUSTIC HORN WITH SUCTION MEANS
Robert S. Soloff, Hillsdale, N.J., assignor to Branson Instruments, Incorporated, Stamford, Conn., a corporation of Delaware
Filed Mar. 10, 1967, Ser. No. 622,113
Int. Cl. B23p 17/00; B23k 5/20, 29/00
U.S. Cl. 29—200    4 Claims

ABSTRACT OF THE DISCLOSURE

A solid acoustic horn used for sonic or ultrasonic energy insertion or welding is provided with a central bore terminating at the front surface of the horn. Responsive to vacuum applied to the bore, the horn is adapted to temporarily retain at its front surface small elements to be inserted into or welded to a workpiece under the influence of the sonic energy transmitted by the horn.

---

This invention refers to a solid acoustic horn, particularly one which is useful for sonic welding and insertion apparatus.

Welding of rigid or flexible thermoplastic parts by sonic energy and the insertion of metal elements into a thermoplastic body by means of ultrasonic vibrations is well known in the art, having been described for instance in U.S. Patents No. 2,224,916 R. S. Soloff et al. and No. 3,184,353 L. Balamuth et al. Generally, an electrical high frequency generator energizes an electroacoustic converter which is provided with a magnetostrictive or an electrostrictive transducer element for converting electrical energy to sonic vibrations. The converter is fitted with a solid horn which transfers the sonic energy from the converter to the workpiece. The horn, sometimes known also as a mechanical impedance transformer, may take various shapes, depending upon whether a certain gain condition between the oscillations at the input surface and those at the output surface is desired.

When welding or inserting a small element to a larger workpiece, considerable difficulty is encountered in accurately positioning and retaining the small element in position relative to the larger workpiece, both before and during the transfer of sonic energy. A typical illustration of this type is the inserting of a metal hinge into an eyeglass frame. The hinge is relatively small and difficult to support in proper position relative to the eyeglass frame. In typical applications, it has been necessary to reverse the accepted operating procedure, that is using the acoustic converter with horn still disposed vertically, but placed underneath a table and the horn extending upwardly so that the frontal surface of the horn is substantially flush with the table top. A hinge is then placed on the horn's frontal surface, for instance, by tweezers, and the eyeglass frame laid thereupon for insertion. It will be apparent that this is a very awkward method of operation which is contrary to the accepted and more desirable method of operating sonic equipment.

A considerable improvement has been achieved by constructing the horn with a suction means which is adapted to pick up a small part and hold it in contact with the horn. Hence, the horn is used for positioning the part on the workpiece to which such part is to be bonded. This method of operation provides for more accurate positioning, greater ease and convenience, and simplified operation of the entire process.

One of the principal objects of this invention is therefore the provision of a new and improved acoustic horn.

Another object of this invention is the provision of an acoustic horn adapted for welding thermoplastic parts and for inserting metal elements into thermoplastic parts by the use of sonic energy, the horn being provided with vacuum means to temporarily retain thereagainst such parts and elements.

A further object of this invention is the provision of suction means disposed on an acoustic horn, such suction means providing for the holding of small particles which are to be joined to a larger workpiece by sonic or ultrasonic energy, whereby the horn transports the picked up part and places it in proper position on another workpiece to which the picked up part is to be joined.

Further and still other objects of this invention will be more clearly apparent by reference to the following description when taken in conjunction with the accompanying drawing:

The figure is a vertical view, partly in section, of the acoustic horn design per my invention.

Referring now to the figure, numeral 10 generally identifies a solid acoustic horn, made typically of titanium metal, which is suited for inserting a metallic hinge 12 into a thermoplastic eyeglass frame 14 supported on an anvil 13 in response to sonic vibrations applied between the element 12 and the frame 14. In order to accomplish this process the horn, vibrating predominantly along the longitudinal axes at its natural resonant frequency, must contact the hinge 12 while the hinge is urged into the body of the frame 14. The acoustic vibrations cause a softening of the thermoplastic material at the interface bewteen the hinge and the frame, permitting the hinge 12 to be sunk into the frame.

The horn 10 is provided with a threaded stud 20 for coupling the horn to an electroacoustic converter 11, and has an input surface 22 at which sonic vibrations are received and an output surface 24 at which sonic vibrations are transferred upon the workpiece 12 which is to be fastened to the workpiece 14. The output surface 24, as shown, is a part of a separate horn tip 26 which is threaded into the horn 10, thereby providing ready replacement and exchange. The tip 26 is fitted with a recess 28 which is dimensioned so as to provide a snug fit with a portion of the workpiece 12. Therefore, if a different workpiece 12 is used, another suitable tip 26 is threaded into the horn 10.

An axially extending channel 32 is disposed centrally within the horn and extends through the tip 26, terminating open ended within the recess 28. At the upper end of the channel 32 there is provided a radially directed feeder channel 34 which terminates in a fitting 36 which is threaded upon the horn 10. The fitting 36 is adapted to be connected by a suitable hose to a suction pump, thereby providing suction through the feeder channel 34 and the axially extending channel 32 to the tip of the horn for retaining the small element or workpiece 12 placed against the underside of the horn in contact therewith and permitting suitable positioning of the part 12 on the larger workpiece 14 as the horn is moved toward the workpiece 14. The feeder portion 34 of the channel and the fitting 36 are generally disposed within the nodal region of the horn in order to prevent relative motion between the fitting 36 and the horn body 10 in an axial direction, such motion leading to fatigue and cracking.

Operation of this arrangement may be visualized as follows:

The horn is fitted to a converter which is mounted for reciprocating motion toward and away from the workpiece 14 by means of pneumatic pressure. With a suction pump providing suction to the frontal surface of the horn, a small element or workpiece, such as the hinge 12, is briefly brought against the underside of the horn and the suction retains the hinge 12 thereat. Responsive to fluid pressure the horn 10 moves toward the workpiece 14 and as the piece 12 is in contact with the larger workpiece 14 sonic energy is provided, thereby causing the piece 12 to be fitted into the workpiece 14. Next, the sonic energy is shut off and a brief dwell period is provided which permits the thermoplastic material of the workpiece 14 to harden around the piece 12. Subsequently the horn 10 is lifted free of the workpiece 14. It has been found that the suction does not need to be shut off during the withdrawal of the horn from the workpiece.

It will be apparent that the horn with suction means provides a most convenient way for manipulating relatively flimsy and difficult to retain elements which are to be joined to a larger workpiece, and that the positioning of such parts is greatly improved and facilitated.

While the foregoing illustration has described an insertion application, it will be apparent that the same principle may be used when welding two thermoplastic workpieces to one another as shown in the patent to R. S. Soloff et al. supra.

What is claimed is:

1. A solid acoustic horn of longitudinal shape adapted to receive acoustic vibrations at an input surface and provide sonic energy via a removable tip to a workpiece at an opposite output surface, the improvement comprising:
   said tip being in threaded engagement with said horn and having a frontal surface contoured to receive therein, at least partially, a first workpiece which is to be joined to a second workpiece in response to sonic vibrations applied to the input surface of said horn;
   a centrally disposed channel extending open-ended from said tip in axial direction toward said input surface and terminating in a radially directed feeder portion disposed substantially in a nodal region of said horn;
   said feeder portion leading to the outer surface of said horn and constituting the terminus of said channel, and
   a fitting adapted to be coupled to a suction pump provided at said terminus for providing suction through said feeder portion and axial channel at the frontal surface of said tip,
   whereby responsive to the existence of suction in said channel a first workpiece is adapted to be held against the frontal surface of said tip.

2. A solid acoustic horn of longitudinal shape adapted to receive acoustic vibrations at an input surface and provide sonic energy at an opposite output surface adapted to engage a first workpiece, the improvement comprising:
   a longitudinal channel disposed in said horn and extending open ended from said output surface in axial direction toward said input surface and communicating with a radially directed feeder channel disposed substantially in a nodal region of said horn;
   said feeder channel leading to the outer surface of said horn, and
   means for causing said feeder channel to be coupled to a suction pump for providing suction through said feeder channel and axial channel at the output surface of said horn,
   whereby responsive to the existence of suction in said channels a first workpiece is adapted to be held against said output surface.

3. A solid acoustic horn as set forth in claim 2, said horn having a threaded portion at its input surface for coupling the horn to an electroacoustic converter.

4. A solid acoustic horn as set forth in claim 2, said horn being made of titanium metal.

References Cited

UNITED STATES PATENTS

| | | | |
|---|---|---|---|
| 3,017,792 | 1/1962 | Elmore et al. | 228—1 |
| 3,056,317 | 10/1962 | Huber et al. | 228—6 |
| 3,184,353 | 5/1965 | Balamuth et al. | 156—73 |
| 3,224,916 | 12/1965 | Soloff et al. | 156—73 |
| 3,257,721 | 6/1966 | Jones | 29—470.1 |
| 3,357,090 | 12/1967 | Tiffany | 29—470 |

THOMAS H. EAGER, Primary Examiner

U.S. Cl. X.R.

29—470; 156—73, 580; 228—1